United States Patent
Uno

(10) Patent No.: US 9,525,784 B2
(45) Date of Patent: Dec. 20, 2016

(54) IMAGE PROCESSING SYSTEM, INFORMATION PROCESSING APPARATUS, DISPLAY METHOD, AND COMPUTER-READABLE, NON-TRANSITORY MEDIUM

(71) Applicant: PFU Limited, Kahoku-shi, Ishikawa (JP)

(72) Inventor: Toshihiko Uno, Kahoku (JP)

(73) Assignee: PFU Limited, Kahoku-shi (JP)

( * ) Notice: Subject to any disclaimer, the term of this patent is extended or adjusted under 35 U.S.C. 154(b) by 102 days.

(21) Appl. No.: 13/759,894

(22) Filed: Feb. 5, 2013

(65) Prior Publication Data
US 2013/0278965 A1 Oct. 24, 2013

(30) Foreign Application Priority Data

Apr. 18, 2012 (JP) .................................. 2012-094971
Jul. 31, 2012 (JP) .................................. 2012-170396

(51) Int. Cl.
*H04N 1/00* (2006.01)
*H04N 1/32* (2006.01)
*G06F 3/06* (2006.01)

(52) U.S. Cl.
CPC ............ *H04N 1/00095* (2013.01); *G06F 3/06* (2013.01); *H04N 1/00233* (2013.01);
(Continued)

(58) Field of Classification Search
CPC ............... H04N 2201/0081; H04N 2201/0094; H04N 1/00737; H04N 1/00795; H04N 1/121; H04N 1/00742; H04N 1/32539; H04N 1/00013; H04N 1/00095; H04N 1/00233; H04N 1/32507; H04N 2201/0091; H04N 1/00002; H04N 2201/0055; H04N 2201/0072; G06F 3/06
(Continued)

(56) References Cited

U.S. PATENT DOCUMENTS 8,514,438 B2 * 8/2013 Nishio ................... G06F 3/1208
358/1.13
2005/0128968 A1 6/2005 Yang
(Continued)

FOREIGN PATENT DOCUMENTS

CN 100418780 C 9/2004
CN 101448059 A 6/2009
(Continued)

OTHER PUBLICATIONS

Office action mailed on Mar. 23, 2015 for corresponding Chinese patent application No. 2013101334463.2, including English translation 33pp.
(Continued)

*Primary Examiner* — Habte Mered
*Assistant Examiner* — Rownak Islam
(74) *Attorney, Agent, or Firm* — Lewis Roca Rothgerber Christie LLP

(57) ABSTRACT

There are provided an image processing system, an information processing apparatus, display method and a computer-readable, non-transitory medium that can enhance user convenience when selecting an image reading apparatus. The image processing system has a plurality of image reading apparatuses and an information processing apparatus. Each of the image reading apparatuses includes a state detector for detecting a change in an operational state, and a transmission controller for transmitting the change detected in the operational state to the information processing apparatus, and the information processing apparatus
(Continued)

includes a display unit, a reception controller for receiving the change detected in the operational state, and a display controller for causing the display unit to display a list of image reading apparatuses that is created by selecting image reading apparatus whose operational state has changed and by arranging the selected image reading apparatuses in order of the time the operational state changed.

9 Claims, 15 Drawing Sheets

(52) U.S. Cl.
CPC . *H04N 1/32507* (2013.01); *H04N 2201/0055* (2013.01); *H04N 2201/0072* (2013.01); *H04N 2201/0081* (2013.01)

(58) Field of Classification Search
USPC .............. 358/1.15, 474, 400, 498, 1.1, 1.9
See application file for complete search history.

(56) References Cited

U.S. PATENT DOCUMENTS

| | | | |
|---|---|---|---|
| 2006/0103881 A1 | 5/2006 | Matsuda | |
| 2007/0206791 A1* | 9/2007 | Okamoto | H04L 9/0861 380/54 |
| 2008/0003010 A1* | 1/2008 | Isogai | H04N 1/0035 399/81 |
| 2009/0136124 A1 | 5/2009 | Matsuzaki | |
| 2009/0225753 A1* | 9/2009 | Takano | H04L 12/2861 370/390 |
| 2009/0244659 A1* | 10/2009 | Ito | 358/498 |
| 2009/0257097 A1* | 10/2009 | Ishida | H04N 1/00164 358/448 |
| 2009/0303551 A1* | 12/2009 | Okada | H04N 1/00795 358/474 |
| 2010/0074633 A1 | 3/2010 | Kuwasaki | |
| 2011/0261405 A1* | 10/2011 | Ito | G06F 1/3203 358/1.15 |
| 2011/0292432 A1* | 12/2011 | Matsusaka | H04N 1/00352 358/1.14 |
| 2011/0317224 A1* | 12/2011 | Nagai | H04N 1/00204 358/448 |
| 2012/0092715 A1* | 4/2012 | Kamei | G06F 3/04886 358/1.15 |

FOREIGN PATENT DOCUMENTS

| | | |
|---|---|---|
| CN | 101685280 A | 3/2010 |
| JP | 8-44968 | 2/1996 |
| JP | 2000-298540 | 10/2000 |
| JP | 2002-16619 | 1/2002 |
| JP | 2002-101238 | 4/2002 |
| JP | 2002-218153 | 8/2002 |
| JP | 2005-130102 | 5/2005 |

OTHER PUBLICATIONS

Office action mailed Sep. 15, 2015 in corresponding Japanese patent application No. 2012170396, including English translation 9pp.

\* cited by examiner

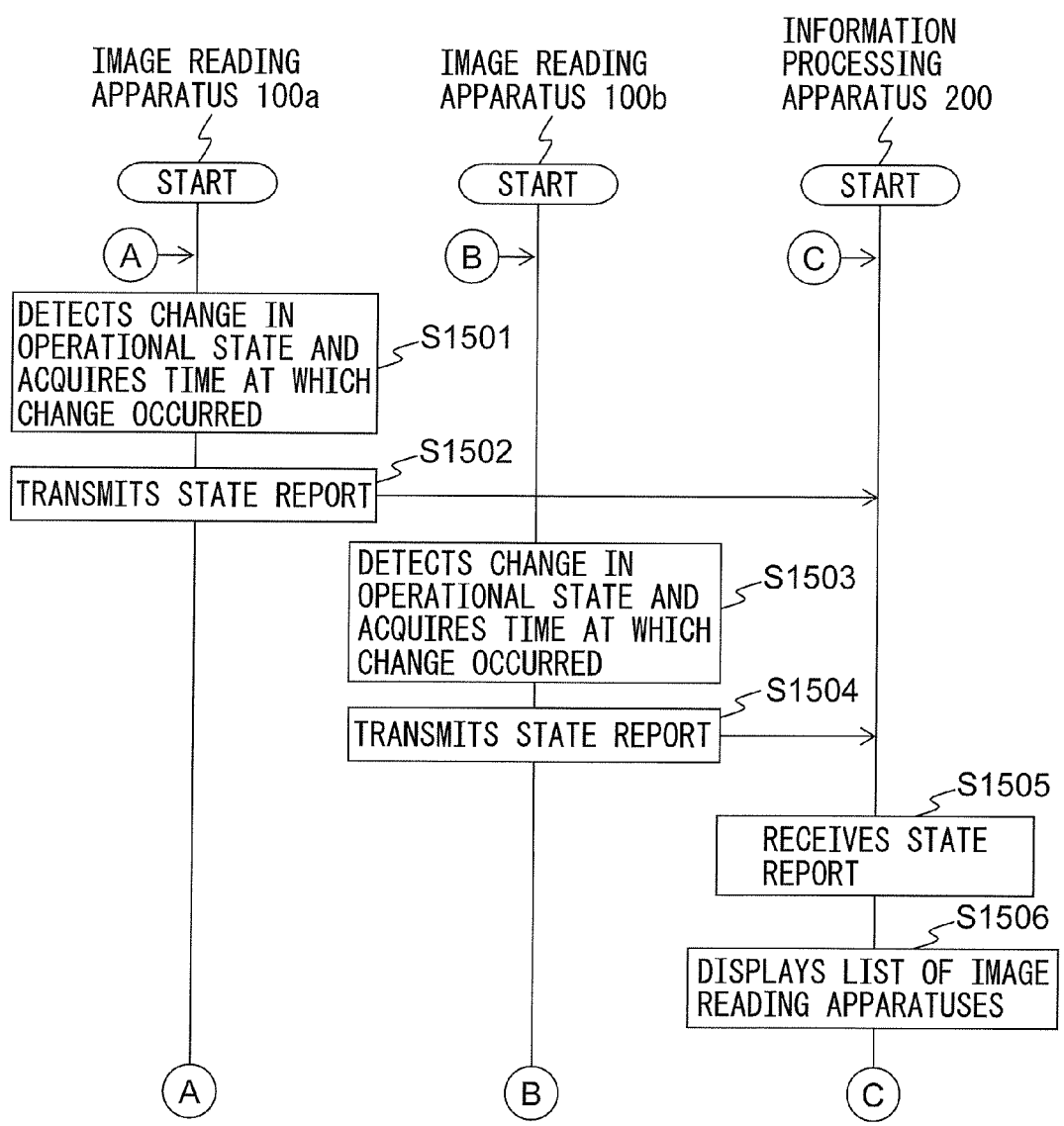

IMAGE PROCESSING SYSTEM, INFORMATION PROCESSING APPARATUS, DISPLAY METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2012-094971, filed on Apr. 18, 2012 and No. 2012-170396, filed on Jul. 31, 2012, the entire contents of which are incorporated herein by reference.

TECHNICAL FIELD

Embodiments discussed in the present specification relate to image processing technology.

BACKGROUND

In offices, etc., it is sometimes a plurality of apparatuses, such as scanners, printers, facsimile machines, and MFPs (Multifunction Peripherals), are installed and used in one room. In recent years, a portable terminal has been used for controlling such apparatuses. When a user wishes to read, print, or transmit images using such apparatuses, generally the portable terminal displays a list of the names of the apparatuses available for use, along with their IP (Internet Protocol) addresses, etc., from which the user selects the desired apparatus. However, there has been the problem that the user may not recognize the names, IP addresses, etc., of the apparatuses, and may not know which of the apparatuses displayed on the list corresponds to the apparatus the user desires to use.

U.S. Laid-open Patent Publication No. 2005/0128968 discloses a printing system having a plurality of printers and a mobile communication terminal. The mobile communication terminal determines the distance to each printer based on the intensity of a wireless signal transmitted from the printer, and selects the printer located nearest to the terminal as the printer to be used for printing.

SUMMARY

According to the printing system disclosed in U.S. Laid-open Patent Publication No. 2005/0128968, the printer located nearest to the terminal can be designated as the printer to be used for printing. However, it is not always the case that the printer located nearest to the mobile communication terminal is the apparatus that the user desires to use.

Accordingly, it is an object of the present invention to provide an image processing system having a plurality of image reading apparatuses and an information processing apparatus, and more particularly to provide an image processing system, information processing apparatus, and display method that can enhance user convenience when selecting an image reading apparatus by operating the information processing apparatus, and a computer-readable, non-transitory medium storing a computer program for causing a computer to implement such a display method.

According to an aspect of the system, there is provided an image processing system. The image processing system has a plurality of image reading apparatuses and an information processing apparatus. Each of the plurality of image reading apparatuses includes a first communication unit for communicating with the information processing apparatus, a state detector for detecting a change in an operational state of the image reading apparatus, and a transmission controller for transmitting the change detected in the operational state to the information processing apparatus via the first communication unit, and the information processing apparatus includes a display unit, a second communication unit for communicating with each of the plurality of image reading apparatuses, a reception controller for receiving via the second communication unit the change detected in the operational state, and a display controller for causing the display unit to display a list of image reading apparatuses that is created by selecting from among the plurality of image reading apparatuses any image reading apparatus whose operational state has changed and by arranging the selected image reading apparatuses in order of the time the operational state changed.

According to an aspect of the apparatus, there is provided an information processing apparatus. The information processing apparatus includes a display unit, a communication unit for communicating with each of a plurality of image reading apparatuses, a reception controller for receiving via the communication unit a change detected in an operational state of the each image reading apparatus from each of the plurality of image reading apparatuses, and a display controller for causing the display unit to display a list of image reading apparatuses that is created by selecting from among the plurality of image reading apparatuses any image reading apparatus whose operational state has changed and by arranging the selected image reading apparatuses in order of the time the operational state changed.

According to an aspect of the method, there is provided a display method. The display method includes receiving a change detected in an operational state of the each image reading apparatus from each of a plurality of image reading apparatuses, and displaying, using a computer, a list of image reading apparatuses that is created by selecting from among the plurality of image reading apparatuses any image reading apparatus whose operational state has changed and by arranging the selected image reading apparatuses in order of the time the operational state changed.

According to an aspect of the computer-readable, non-transitory medium storing a computer program, the computer program causes a computer to execute a process, including receiving a change detected in an operational state of the each image reading apparatus from each of a plurality of image reading apparatuses, and displaying a list of image reading apparatuses that is created by selecting from among the plurality of image reading apparatuses any image reading apparatus whose operational state has changed and by arranging the selected image reading apparatuses in order of the time the operational state changed.

According to the image processing apparatus and the image processing method, and the computer-readable, non-transitory medium, it is possible to enhance user convenience when selecting an image reading apparatus by operating the information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 15 is a sequence diagram illustrating another example of the sequence of list display operations.

DESCRIPTION OF EMBODIMENTS

An image processing system, information processing apparatus, display method, and computer program will be described below with reference to the drawings. It will, however, be noted that the technical scope of the invention is not limited to the specific embodiments described herein but extends to the inventions described in the appended claims and their equivalents.

Figure 1:
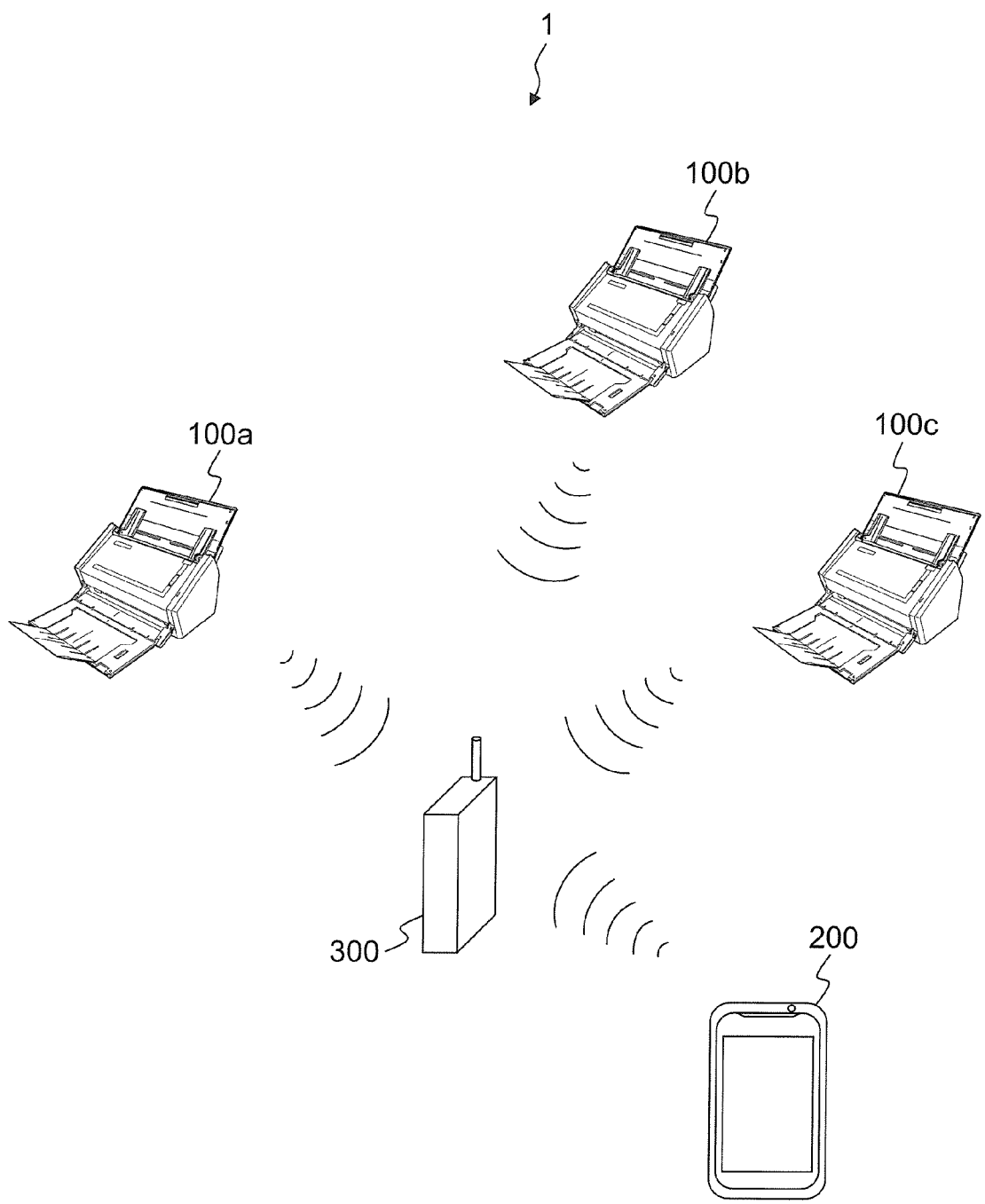
FIG. 1 is a diagram illustrating schematically the configuration of an image processing system according to an embodiment.

FIG. 1 is a diagram illustrating an image processing system according to an embodiment. The image processing system 1 includes a plurality of image reading apparatuses 100a to 100c, an information processing apparatus 200 which is connected to the image reading apparatuses 100a to 100c via a wireless communication circuit, and an access point 300 which is connected to the image reading apparatuses 100a to 100c as well as to the information processing apparatus 200 via wireless communication and which operates as a network switch. Since the plurality of image reading apparatuses 100a to 100c are identical in function, the plurality of image reading apparatuses 100a to 100c will hereinafter be referred to collectively as the image reading apparatus 100. The image reading apparatus 100 is, for example, an image scanner, and the information processing apparatus 200 is, for example, a portable information terminal.

Figure 2A:
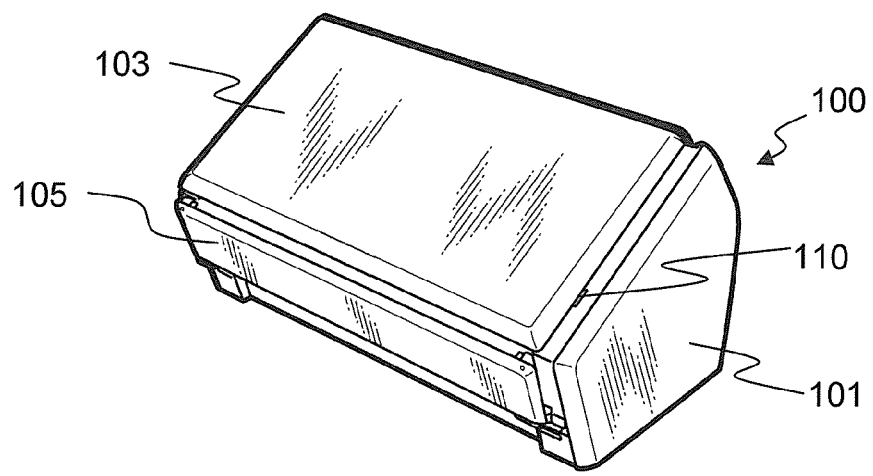
FIG. 2A is a perspective view of an image reading apparatus.
Figure 2B:
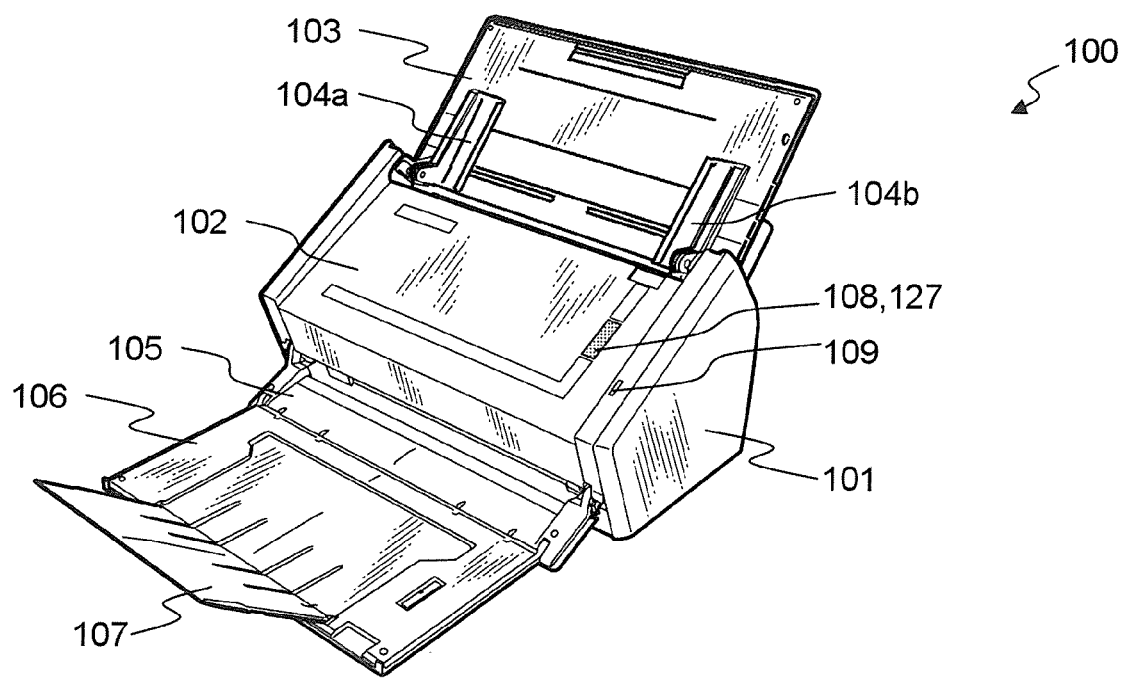
FIG. 2B is a perspective view of an image reading apparatus.
Figure 3A:
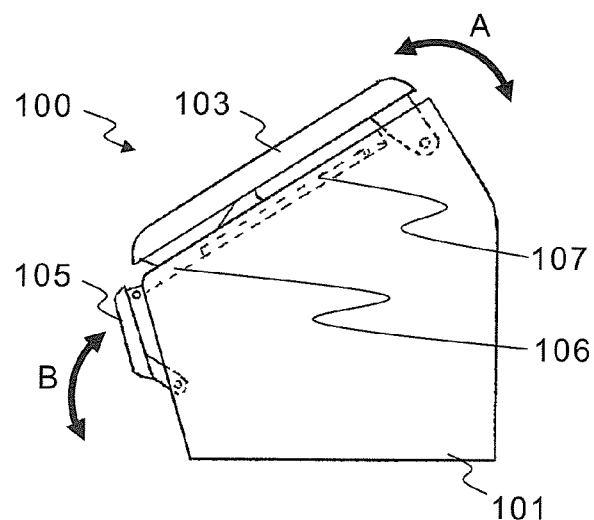
FIG. 3A is a side view of the image reading apparatus.
Figure 3B:
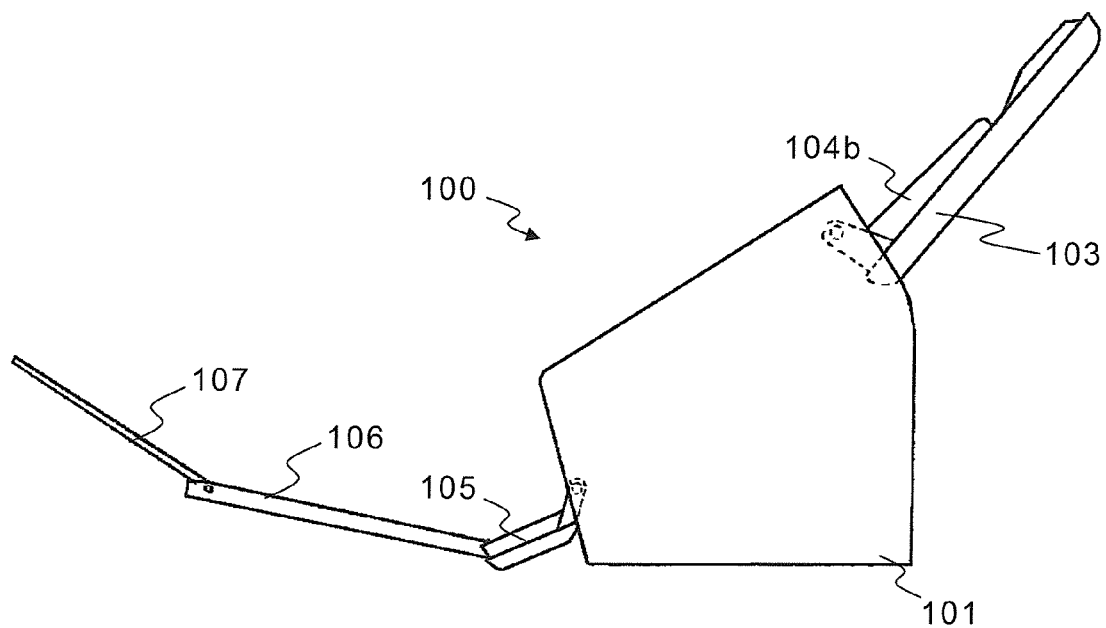
FIG. 3B is a side view of the image reading apparatus.

FIG. 2A is a perspective view showing the image reading apparatus 100 when a document tray is not set in position, and FIG. 2B is a perspective view showing the image reading apparatus 100 when the document tray is set in position. FIG. 3A is a side view showing the image reading apparatus 100 when the document tray is not set in position, and FIG. 3B is a side view showing the image reading apparatus 100 when the document tray is set in position.

The image reading apparatus 100 includes a housing 101, a top plate 102, the document tray 103, a front cover 105, a top cover 106, an auxiliary cover 107, an operation button 108, and an open/close detection unit 109.

The housing 101, together with the top plate 102, document tray 103, front cover 105, top cover 106, and auxiliary cover 107, constitutes the exterior of the image reading apparatus 100.

The top plate 102 is placed so as to cover the top of the image reading apparatus 100, and is joined to the housing 101 by a hinge in such a manner that the top plate 102 can be opened and closed in such cases as when clearing a paper jam or when cleaning the interior of the image reading apparatus 100.

The document tray 103 is joined to the housing 101 by a hinge in such a manner that the document tray 103 can be turned in the direction indicated by arrow A in FIG. 3A. In the condition shown in FIG. 3A, the document tray 103 is closed so as to cover the top plate 102, top cover 106, and auxiliary cover 107, and thus serves as an exterior cover. On the other hand, in the condition shown in FIG. 3B, the document tray 103 is set in position so that a document can be placed thereon. The document tray 103 is provided with document guides 104a and 104b that are mounted so as to be slidable in lateral directions perpendicular to the document transport direction. With the positions set according to the width of the document, the document guides 104a and 104b serve to restrict the lateral movement of the document.

The front cover 105 is joined to the housing 101 by a hinge in such a manner that the front cover 105 can be turned in the direction indicated by arrow B in FIG. 3A. The top cover 106 is joined at one end to the front cover 105 and at the other end to the auxiliary cover 107. The auxiliary cover 107 is pulled out of the top cover 106, when needed, to receive the document thereon.

The operation button 108 is located on the upper surface of the top plate 102 and, when depressed, generates an operation detection signal which is sent to a first central processing unit 130 to be described later. When the operation detection signal is received, the first central processing unit 130 initiates a document reading process as will be described later.

The open/close detection unit 109 includes a sensor located opposite the closed document tray 103, and detects the opening and closing of the document tray 103. The open/close detection unit 109 generates an open/close detection signal whose signal value differs according to whether the document tray 103 is opened or closed, and sends the detection signal to the first central processing unit 130.

Figure 4:
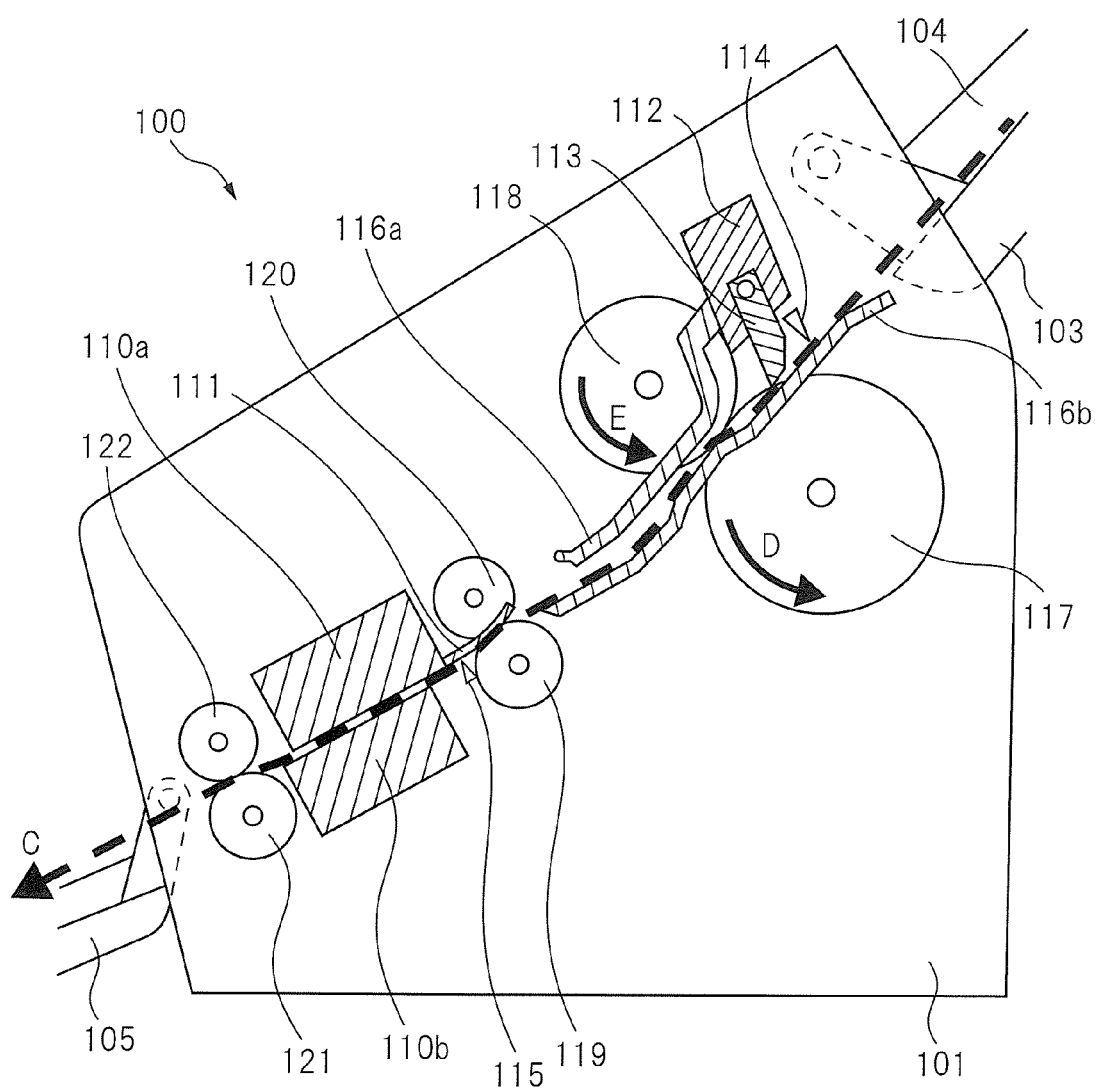
FIG. 4 is a diagram for explaining a transport path inside the image reading apparatus.

FIG. 4 is a diagram for explaining a transport path inside the image reading apparatus 100. In FIG. 4, arrow C indicates the document transport path.

As shown in FIG. 4, the image reading apparatus 100 further includes a first reading unit 110a, a second reading unit 110b, a set guide 112, a flap 113, a first document detection unit 114, a second document detection unit 115, an upper guide 116a, a lower guide 116b, a paper feed roller 117, a retarding roller 118, a first transport roller 119, a first driven roller 120, a second transport roller 121, and a second driven roller 122.

The first reading unit 110a, which includes an image sensor equipped with a CMOS (Complementary Metal Oxide Semiconductor) imaging device, reads information from the reverse side of the document and generates an image signal which is supplied to the first central processing unit 130. Similarly, the second reading unit 110*b*, which includes an image sensor equipped with a CMOS imaging device, reads information from the front side of the document and generates an image signal which is supplied to the first central processing unit 130. The first reading unit 110*a* is provided with a reading unit guide 111 for guiding the document into the path between the first reading unit 110*a* and the second reading unit 110*b*. Alternatively, only one of the first and second reading units 110*a* and 110*b* may be provided so as to read only one side of the document. Further, instead of the CMOS imaging device, a CCD (Charge Coupled Device) imaging device may be used. In the following description, the first and second reading units 110*a* and 110*b* may sometimes be referred to collectively as the reading unit 110.

The set guide 112 is provided with the flap 113 that contacts the leading edge of the document placed on the document tray 103.

The first document detection unit 114 includes a sensor disposed upstream of the set guide 112, and detects whether or not any document is placed on the document tray 103. The first document detection unit 114 generates a first document detection signal whose signal value differs according to whether or not any document is placed on the document tray 103, and sends the detection signal to the first central processing unit 130.

The second document detection unit 115 includes a sensor disposed upstream of the reading unit 110, and detects whether or not there is any document on the upstream side of the reading unit 110. The second document detection unit 115 generates a second document detection signal whose signal value differs according to whether or not there is any document on the upstream side of the reading unit 110, and sends the detection signal to the first central processing unit 130.

Next, the document transport operation will be described.

First, as a document transport preparatory operation, the user who is going to use the image reading apparatus 100 opens the document tray 103, as shown in FIG. 3B, and thereafter places the document on the document tray 103. The leading edge of the document placed on the document tray 103 strikes against the flap 113 of the set guide 112 and held thereon. At this time, the flap 113 is locked against movement by a locking means not shown.

Next, when the user depresses the operation button 108, a motor 123 to be described later is driven under the control of the first central processing unit 130 and unlocks the flap 113 which is thus allowed to swing freely. When the flap 113 is allowed to swing freely, the document is fed under its own weight into the position where it contacts the paper feed roller 117.

As the paper feed roller 117 is rotated by the motor 123 in the direction indicated by arrow D in FIG. 4, the document is fed into the path between the upper guide 116*a* and the lower guide 116*b*. The retarding roller 118 is also rotated by the motor 123 in the direction indicated by arrow E in FIG. 4. When multiple documents are placed on the document tray 103, the retarding roller 118 acts to prevent any document other than the document contacting the paper feed roller 117 from being fed (thus preventing multiple feeding of documents).

Next, while being guided by the reading unit guide 111, the document is fed into the path between the first reading unit 110*a* and the second reading unit 110*b* by the action of the first transport roller 119 and the first driven roller 120. The document read by the reading unit 110 is transported by the second transport roller 121 and the second driven roller 122 and fed out onto the front cover 105, top cover 106, and auxiliary cover 107.

Figure 5:
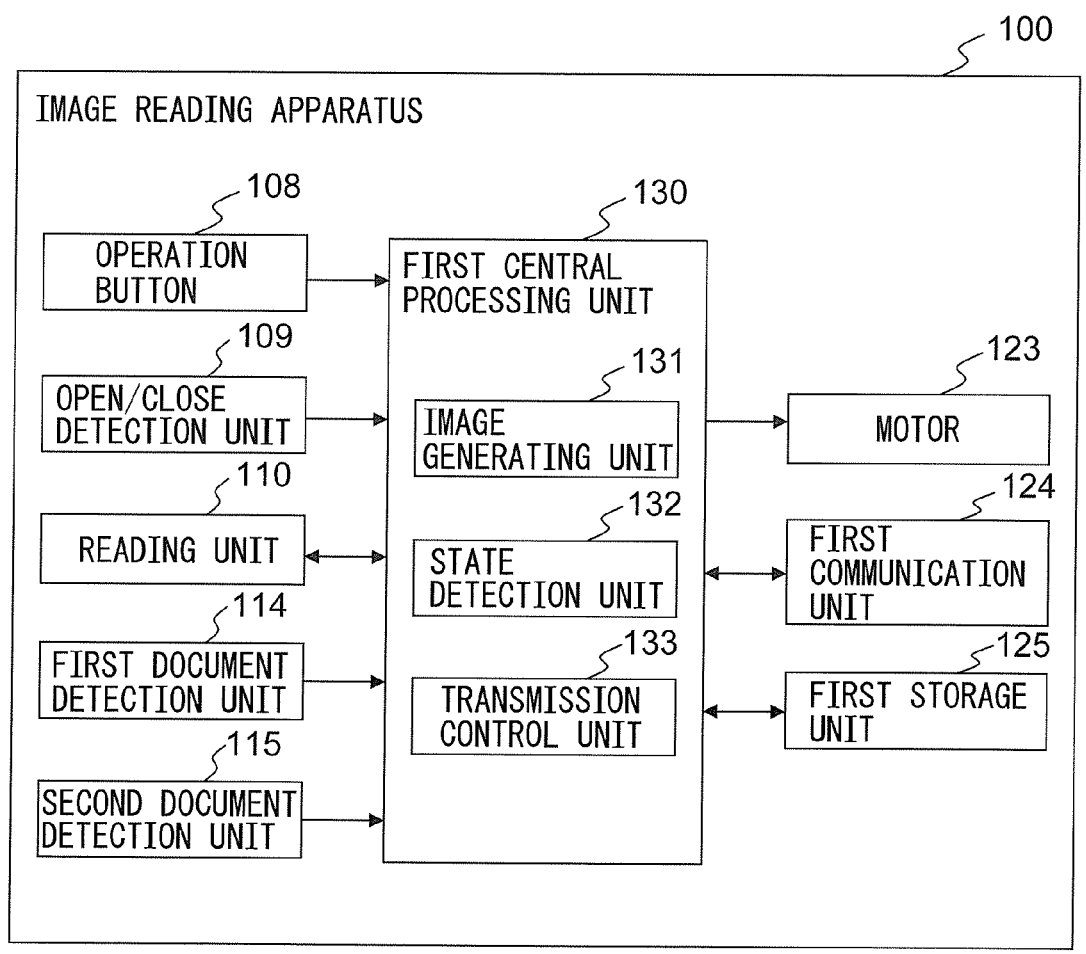
FIG. 5 is a diagram illustrating schematically the configuration of the image reading apparatus.

FIG. 5 is a diagram illustrating schematically the configuration of the image reading apparatus 100. The image reading apparatus 100 includes the motor 123, a first communication unit 124, a first storage unit 125, and the first central processing unit 130, in addition to the component elements shown in FIGS. 2A, 2B, 3A, 3B, and 4.

The motor 123 is driven to rotate the paper feed roller 117, retarding roller 118, first transport roller 119, and second transport roller 120, and generates a driving force to unlock the flap 113.

The first communication unit 124 includes an antenna for transmitting and receiving wireless signals and a wireless communication interface circuit for transmitting and receiving signals via a wireless communication circuit in accordance with a prescribed communication protocol, and performs communications with the information processing apparatus 200 via the access point 300. The first communication unit 124 may perform communications with the information processing apparatus 200 directly without the intervention of the access point 300.

The first storage unit 125 includes a memory device such as a RAM (Random Access Memory) or ROM (Read Only Memory), a fixed disk device such as a hard disk, or a removable storage device such as a flexible disk or an optical disk. The first storage unit 125 stores a computer program, data base, table, etc., which are used by the image reading apparatus 100 to perform various processing operations. The first storage unit 125 also stores image data generated from reading documents. The computer program may be installed on the first storage unit 125 from a computer-readable, non-transitory medium such as a compact disk read only memory (CD-ROM), a digital versatile disk read only memory (DVD-ROM), or the like by using a well-known setup program or the like.

The first central processing unit 130 includes a CPU (central processing unit) and operates in accordance with the program prestored in the first storage unit 125. The first central processing unit 130 may be implemented by a DSP (Digital Signal Processor), an LSI (Large Scale Integration) circuit, an ASIC (Application Specific Integrated Circuit), an FPGA (Field-Programmable Gate Array), or the like. The first central processing unit 130 is connected to the operation button 108, open/close detection unit 109, reading unit 110, first document detection unit 114, second document detection unit 115, motor 123, first communication unit 124, and first storage unit 125, and controls these units. The first central processing unit 130 performs control processing such as the driving of the motor 123 and the document reading operation of the reading unit 110, and generates image data by reading the document. Further, the first central processing unit 130 detects the state of the image reading apparatus 100 based on the signals received from the operation button 108, open/close detection unit 109, and first document detection unit 114, and transmits information on the detected state to the information processing apparatus 200 via the first communication unit 124. For these purposes, the first central processing unit 130 includes an image generating unit 131, a state detection unit 132, and a transmission control unit 133. These units are functional modules implemented by software executed on the processor. Alternatively, these units may each be implemented as an independent integrated circuit, microprocessor, firmware, or the like.

Figure 6:
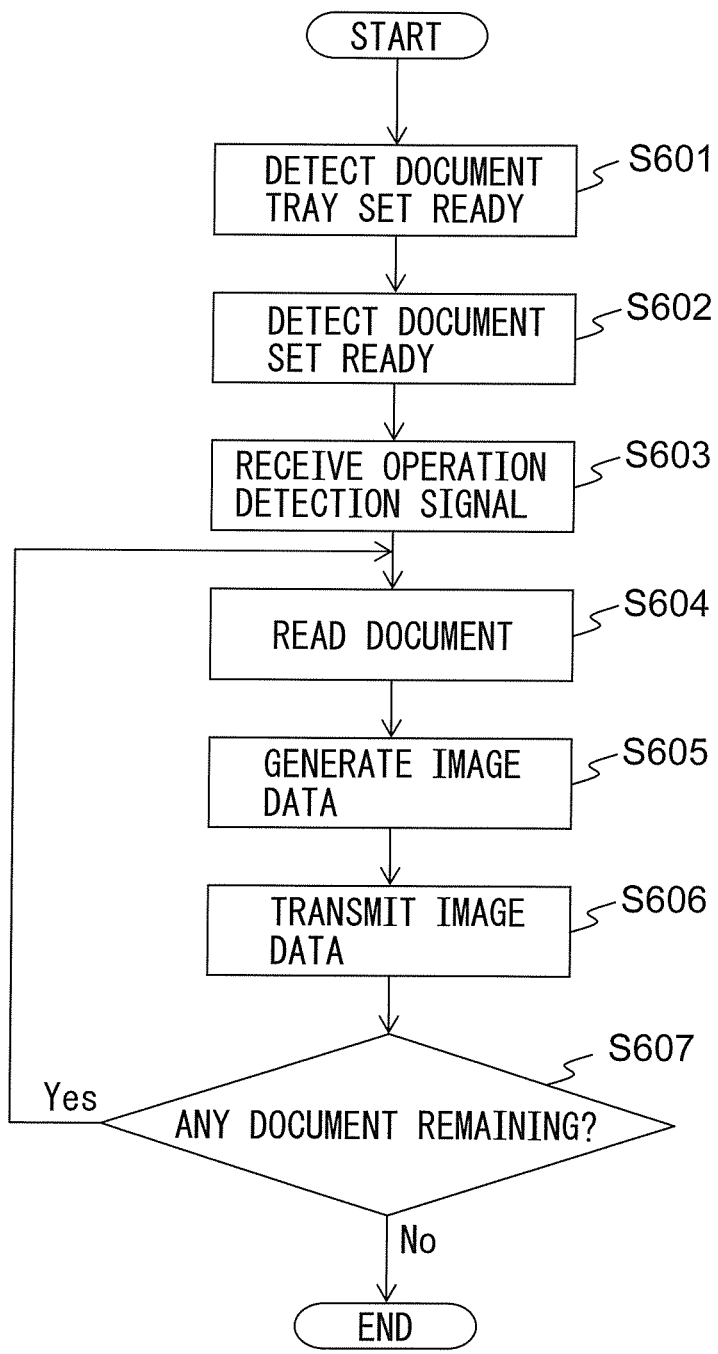
FIG. 6 is a flowchart illustrating an example of an image reading process performed by the image reading apparatus.

FIG. 6 is a flowchart illustrating an example of the image reading process performed by the image reading apparatus 100. One example of the image reading process will be described below with reference to the flowchart of FIG. 6. The operation flow described hereinafter is carried out primarily by the first central processing unit 130 in collaboration with the various component elements of the image reading apparatus 100 in accordance with the program prestored in the first storage unit 125.

First, based on the open/close detection signal received from the open/close detection unit 109, the image generating unit 131 detects the open/close state of the document tray 103, and waits until it is detected that the document tray 103 is opened and set in position (step S601).

Next, based on the first document detection signal received from the first document detection unit 114, the image generating unit 131 detects whether a document is placed on the document tray 103, and waits until it is detected that a document is placed (step S602).

Then, the image generating unit 131 waits until the operation button 108 is depressed by the user and the operation detection signal is received from the operation button 108 (step S603).

When the operation detection signal is received from the operation button 108, the image generating unit 131 activates the motor 123 to transport the document, as earlier described, and causes the reading unit 110 to read the document (step S604). Based on the second document detection signal received from the second document detection unit 115, the image generating unit 131 detects whether the leading edge of the document has reached the upstream side of the reading unit 110, and temporarily stops the driving of the motor 123 when it is detected that the leading edge of the document has reached the upstream side of the reading unit 110. Then, after causing the reading unit 110 to perform calibration, the image generating unit 131 restarts the motor 123 to advance the document to the reading position on the reading unit 110 which thus reads the document.

When the document is read by the reading unit 110, the image generating unit 131 generates image data based on the image signal received from the reading unit 110 (step S605).

Then, the image generating unit 131 transmits the generated image data to the predesignated destination (step S606). After transmitting the image data to the predesignated destination, the image generating unit 131 deletes the image data. If the destination is not designated, the image generating unit 131 stores the generated image data in the first storage unit 125.

Next, based on the first document detection signal received from the first document detection unit 114, the image generating unit 131 detects whether there is any document remaining on the document tray 103 (step S607).

If there is any document remaining on the document tray 103, the image generating unit 131 returns the process to step S604 to repeat the process of steps S604 to S606. On the other hand, if there is no document remaining on the document tray 103, the image generating unit 131 terminates the series of steps.

Figure 7:
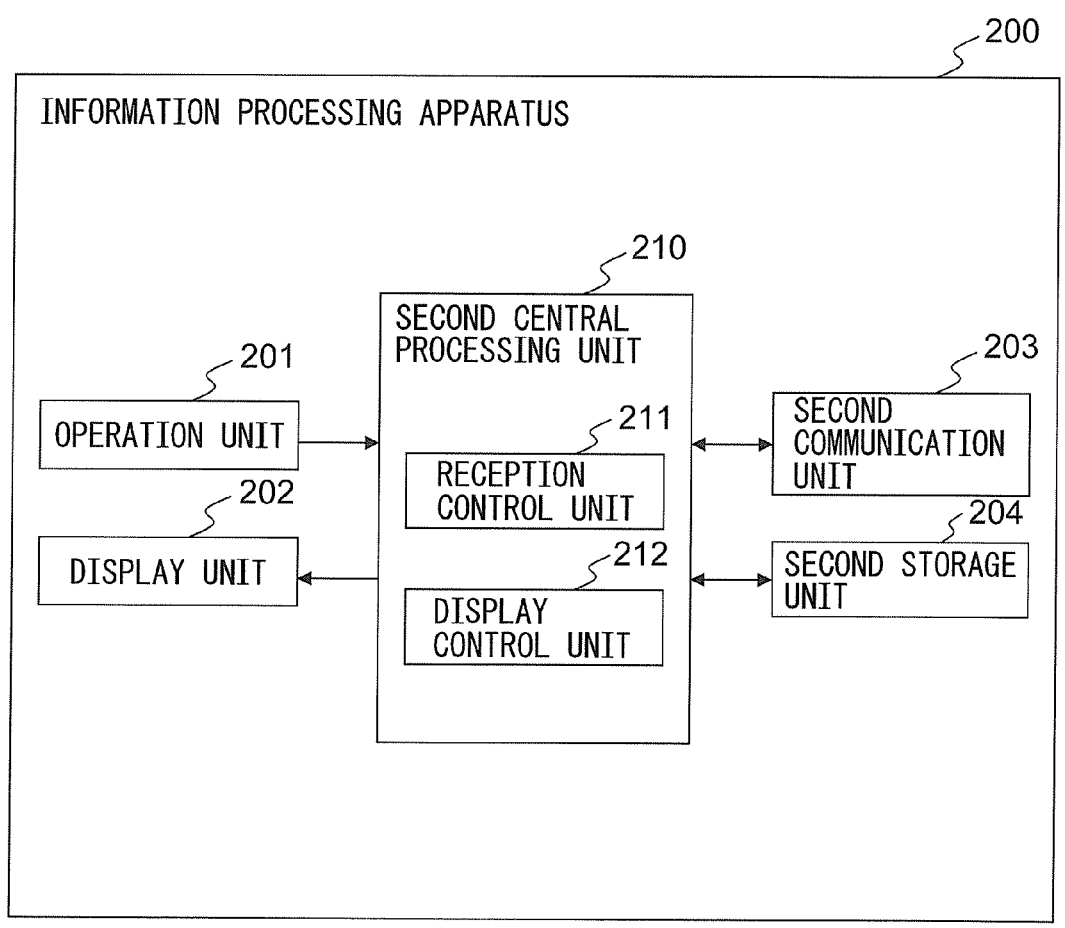
FIG. 7 is a diagram illustrating schematically the configuration of an information processing apparatus.

FIG. 7 is a diagram illustrating schematically the configuration of the information processing apparatus 200. The information processing apparatus 200 includes an operation unit 201, a display unit 202, a second communication unit 203, a second storage unit 204, and a second central processing unit 210. The various units constituting the information processing apparatus 200 will be described in detail below.

The operation unit 202 includes an input device such as a key pad, and an interface circuit for acquiring signals from the input device, and supplies a signal responsive to user operation to the second central processing unit 210.

The display unit 202 includes a display such as a liquid crystal display, and an interface circuit for outputting image data or various kinds of information to the display; the display unit 202 is connected to the second central processing unit 210 and displays information supplied from the second central processing unit 210. The operation unit 201 and the display unit 202 may be combined into one unit by using a touch panel display.

The second communication unit 203 includes an interface circuit similar to that of the first communication unit 124 of the image reading apparatus 100, and connects the information processing apparatus 200 to the access point 300.

The second storage unit 204, similarly to the first storage unit 125 of the image reading apparatus 100, is constructed from a memory device, a fixed disk device, a removable storage device, or the like. The second storage unit 204 stores a computer program, data base, table, etc., which are used by the information processing apparatus 200 to perform various processing operations. The computer program may be installed on the second storage unit 204 from a computer-readable, non-transitory medium such as a compact disk read only memory (CD-ROM), a digital versatile disk read only memory (DVD-ROM), or the like by using a well-known setup program or the like.

The second central processing unit 210 includes a CPU and operates in accordance with the program prestored in the second storage unit 204. The second central processing unit 210 is connected to the operation unit 201, display unit 202, second communication unit 203, and second storage unit 204, and controls these units. The second central processing unit 210 performs control processing to control the input operation of the operation unit 201, the display operation of the display unit 202, the data transmission and reception to and from the image reading apparatus 100 via the second communication unit 203, and the storage operation of the second storage unit 204. Further, the second central processing unit 210 performs processing to display a list of the image reading apparatuses 100. For these purposes, the second central processing unit 210 includes a reception control unit 211 and a display control unit 212. These units are functional modules implemented by software executed on the processor. Alternatively, these units may each be implemented as an independent integrated circuit, microprocessor, firmware, or the like.

Figure 8:
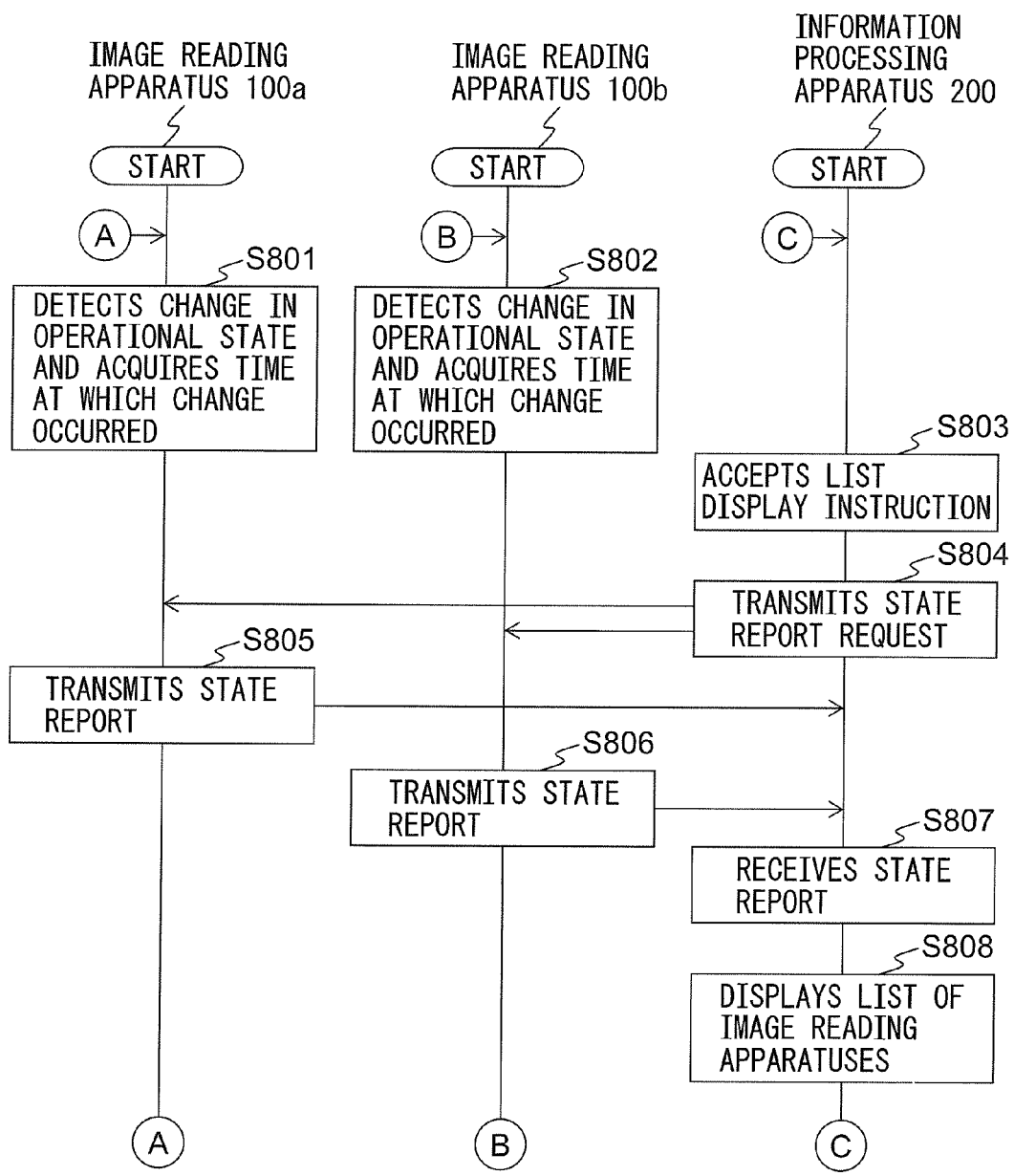
FIG. 8 is a sequence diagram illustrating an example of a sequence of list display operations.

FIG. 8 is a sequence diagram illustrating an example of the sequence of list display operations performed in the image processing system 1. One example of the sequence of list display operations will be described below with reference to the sequence diagram of FIG. 8. The sequence of operations described hereinafter is carried out in the image reading apparatus 100 primarily by the first central processing unit 130 in collaboration with the various component elements of the image reading apparatus 100 in accordance with the program prestored in the first storage unit 125, and in the information processing apparatus 200 primarily by the second central processing unit 210 in collaboration with the various component elements of the information processing apparatus 200 in accordance with the program prestored in the second storage unit 204. In the example shown in FIG. 8, it is assumed that the two image reading apparatuses 100a and 100b are connected to the information processing apparatus 200.

The state detection unit 132 in each of the image reading apparatuses 100a and 100b constantly monitors for a change that may occur in the operational state of its host image reading apparatus 100a or 100b. When a change is detected in the operational state, the state detection unit 132 acquires the time at which the operational state changed (step S801, S802). The operational state here refers to the state in which the image reading apparatus is ready for use, i.e., the state after power is turned on to the image reading apparatus.

The state detection unit 132 detects that the operational state has changed when a document transport preparatory operation is performed. The state detection unit 132 detects whether the document tray 103 has been set ready to hold a document thereon as the document transport preparatory operation. For this purpose, the state detection unit 132 detects the open/close state of the document tray 103 based on the open/close detection signal received from the open/close detection unit 109, and determines whether the document tray 103 is opened and set ready to hold a document thereon. Then, the state detection unit 132 acquires the time at which the operational state changed, which is, in this case, the time at which the document tray 103 was opened and set ready to hold a document thereon.

In the meantime, the second central processing unit 210 in the information processing apparatus 200 accepts via the operation unit 201 an instruction from the user requesting to display a list of image reading apparatuses (step S803).

When the instruction requesting to display a list of image reading apparatuses is accepted, the second central processing unit 210 transmits a state report request via the second communication unit 203 to the respective image reading apparatuses 100a and 100b, requesting them to transmit information as to whether a change has occurred in their operational state (step S804).

It is assumed here that each image reading apparatus to which the second central processing unit 210 transmits the state report request is preset in the second storage unit 204. Alternatively, the second central processing unit 210 may store in the second storage unit 204 information identifying each image reading apparatus to which a connection has ever been made in the past, and may transmit the state report request to such image reading apparatus. Further alternatively, the second central processing unit 210 may broadcast the state report request over a subnet to which the information processing apparatus 200 belongs. This serves to enhance user convenience, because the user need not specify each individual image reading apparatus to be displayed in the list when requesting the information processing apparatus 200 to display the list of image reading apparatuses.

When the state report request is received from the information processing apparatus 200 via the first communication unit 124, the transmission control unit 133 in each of the image reading apparatuses 100a and 100b responds by transmitting via the first communication unit 124 the state report including the information indicating the operational state change detected by the state detection unit 132 and the time at which the change occurred (step S805, S806). After that, the first central processing unit 130 in each of the image reading apparatuses 100a and 100b returns the process to step S801, S802, that is, from A to A and from B to B in the sequence diagram, and repeats the process for detecting an operational state change.

The reception control unit 211 in the information processing apparatus 200 receives the state report via the second communication unit 203 from each of the image reading apparatuses 100a and 100b (step S807).

Based on the state reports received by the reception control unit 211, the display control unit 212 creates a list of image reading apparatuses whose operational states have changed by arranging such image reading apparatuses in descending order of the time the operational state changed, and causes the display unit 202 to display the thus created list (step S808).

More specifically, the display control unit 212 extracts the image reading apparatus 100a or 100b, whichever one whose operational state has changed, from the information indicating the operational state change contained in the state report received by the reception control unit 211. Then, the display control unit 212 creates a list of image reading apparatuses whose operational states have changed by arranging such image reading apparatuses in descending order of the time the operational state changed.

Figure 9:
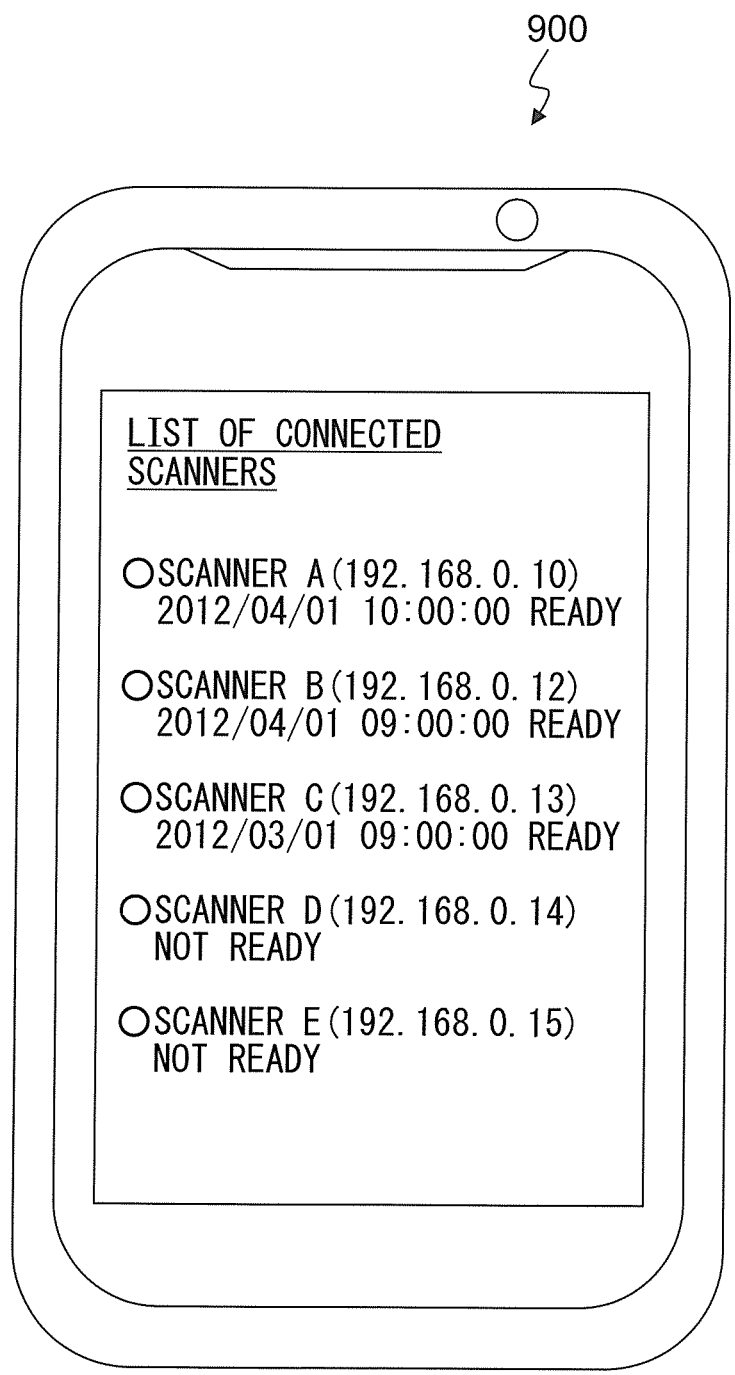
FIG. 9 is a diagram showing one example of a list display screen.

FIG. 9 shows one example of the list display screen to be displayed by the display unit 202. The screen 900 shown in FIG. 9 displays a list of image reading apparatuses along with their names and IP addresses by arranging them from top to bottom in descending order of the time the document tray 103 was set ready. In the example of FIG. 9, scanners D and E whose document trays 103 are not yet set ready are also shown in the list along with scanners A, B, and C whose document trays 103 are set ready, but provisions may be made not to display such scanners D and E.

The second central processing unit 210 thereafter returns the process to step S803, i.e., from C to C in the sequence diagram, and waits until the instruction requesting to display a list of image reading apparatuses is again accepted.

The transmission control unit 133 in each of the image reading apparatuses 100a and 100b may transmit the state report autonomously, rather than transmitting the state report in response to the state report request from the information processing apparatus 200. For example, the transmission control unit 133 in each of the image reading apparatuses 100a and 100b transmits the state report at periodic intervals of time.

Alternatively, the transmission control unit 133 in each of the image reading apparatuses 100a and 100b transmits the state report when the state detection unit 132 has detected a change in the operational state of its host image reading apparatus 100a or 100b. In that case, the reception control unit 211 in the information processing apparatus 200 stores the state report received from each of the image reading apparatuses 100a and 100b in the second storage unit 204. Then, when the instruction requesting to display a list of image reading apparatuses is accepted by the second central processing unit 210, the display control unit 212 creates, based on the state reports stored in the second storage unit 204, a list of image reading apparatuses whose operational states have changed by arranging such image reading apparatuses in descending order of the time the operational state changed, and causes the display unit 202 to display the thus created list.

FIG. 15 is a sequence diagram illustrating another example of the sequence of list display operations performed in the image processing system 1. The sequence shown here can be performed in the image processing system 1 in place of the sequence shown in FIG. 8. The sequence diagram of FIG. 15 differs from the sequence diagram of FIG. 8 in that the transmission control unit 133 in each of the image reading apparatuses 100a and 100b autonomously transmits the state report to the information processing apparatus 200, rather than transmitting the state report in response to the state report request from the information processing apparatus 200. Steps S1505 and S1506 in FIG. 15 are the same as the corresponding steps S807 and S808 in FIG. 8, and therefore will not be described herein, and the following description deals only with the process of steps S1501 to S1504.

In step S1501, the state detection unit 132 in the image reading apparatus 100a constantly monitors for a change that may occur in the operational state of the image reading apparatus 100a. When a change is detected in the operational state, the state detection unit 132 acquires the time at which the operational state changed. When the operational state change of the image reading apparatus 100a is detected by the state detection unit 132, the transmission control unit 133 in the image reading apparatus 100a transmits the state report, including the information indicating the operational state change detected by the state detection unit 132 and the time at which the change occurred, to the information processing apparatus 200 via the first communication unit 124 (step S1502).

Similarly, in step S1503, the state detection unit 132 in the image reading apparatus 100b constantly monitors for a change that may occur in the operational state of the image reading apparatus 100b. When a change is detected in the operational state, the state detection unit 132 acquires the time at which the operational state changed. When the operational state change of the image reading apparatus 100b is detected by the state detection unit 132, the transmission control unit 133 in the image reading apparatus 100b transmits the state report, including the information indicating the operational state change detected by the state detection unit 132 and the time at which the change occurred, to the information processing apparatus 200 via the first communication unit 124 (step S1504).

Since each of the image reading apparatuses 100a and 100b transmits the state report autonomously to the information processing apparatus 200, as described above, the information processing apparatus 200 can acquire the state report without having to transmit the state report request to each of the image reading apparatuses 100a and 100b. This serves to suppress the increase in network load due to transmission of unnecessary packets, because there is no chance that the information processing apparatus 200 will ever transmit the state report request to the image reading apparatuses 100a and 100b when the image reading apparatuses 100a and 100b are not yet powered on.

The document transport preparatory operation that the state detection unit 132 detects is not limited to setting the document tray 103 ready to hold a document thereon. For example, the state detection unit 132 may detect whether a document has been set ready for reading as the document transport preparatory operation. In this case, the state detection unit 132 detects whether a document has been set ready for reading, based on the first document detection signal received from the first document detection unit 114. Then, the state detection unit 132 acquires the time at which the operational state changed, which is, in this case, the time at which the document was set ready for reading. The information processing apparatus 200 can then display a list of image reading apparatuses by arranging the image reading apparatuses in descending order of the time the document was set ready.

Alternatively, the state detection unit 132 may detect generation of new image data as the operational state change. In this case, when the image data is generated in step S605 shown in FIG. 6, the image generating unit 131 sends an image generation signal indicating the generation of the image data to the state detection unit 132. On the other hand, if the destination of the image data is predesignated, the image generating unit 131 transmits the image data to the predesignated destination in step S606 and thereafter deletes the image data; then, the image generating unit 131 sends an image deletion signal indicating the deletion of the image data to the state detection unit 132. When the image generation signal is received from the image generating unit 131, the state detection unit 132 determines that new image data has been generated, and when the image deletion signal is received, it is determined that the image data has been deleted. Then, the state detection unit 132 acquires the time at which the operational state changed, which is, in this case, the time at which the image generation signal was received from the image generating unit 131. The information processing apparatus 200 can then display a list of image reading apparatuses by arranging the image reading apparatuses in descending order of the time the image data was created.

Alternatively, the state detection unit 132 may detect that the operational state has changed when the image reading apparatus 100 has initiated the document reading process. In this case, when the operation detection signal is received from the operation button 108, the state detection unit 132 determines that the image reading apparatus 100 has initiated the document reading process and, when it is detected, based on the first document detection signal received from the first document detection unit 114, that there is no document remaining on the document tray 103, it is determined that the document reading process has been terminated. Then, the state detection unit 132 acquires the time at which the operational state changed, which is, in this case, the time at which the operation detection signal was received from the operation button 108. The information processing apparatus 200 can then display a list of image reading apparatuses by arranging the image reading apparatuses in descending order of the time the operation button was depressed.

Alternatively, the state detection unit 132 may detect that the operational state has changed when the image reading apparatus 100 has terminated the document reading process. In this case, the time at which it was detected that there was no document remaining on the document tray 103 is acquired by the state detection unit 132 as the time at which the operational state changed. The information processing apparatus 200 can then display a list of image reading apparatuses by arranging the image reading apparatuses in descending order of the time they were made available for use by completing the image reading process.

Alternatively, the state detection unit 132 may detect the power-on of the image reading apparatus 100 as the operational state change. In this case, the time at which the image reading apparatus 100 was powered on is acquired by the state detection unit 132 as the time at which the operational state changed. The information processing apparatus 200 can then display a list of image reading apparatuses by arranging the image reading apparatuses in descending order of the time they were powered on.

Alternatively, the state detection unit 132 may detect that the operational state has changed when the image reading apparatus 100 has been connected to the access point 300. In this case, the first communication unit 124 sends a connection signal to the state detection unit 132 when the connection to the access point 300 at the physical layer is completed, and sends a disconnection signal to the state detection unit 132 when a disconnection from the access point 300 at the physical layer is detected. When the connection signal is received from the first communication unit 124, the state detection unit 132 determines that the image reading apparatus 100 has been connected to the access point 300 and, when the disconnection signal is received, it is determined that the image reading apparatus 100 has been disconnected. Then, the state detection unit 132 acquires the time at which the operational state changed, which is, in this case, the time at which the connection signal was received from the first communication unit 124. The first communication unit 124 may send the connection signal when the connection to the access point 300 at the MAC (Medium Access Control) layer or higher layer is completed, and may send the disconnection signal when a disconnection at the MAC layer or higher layer is detected. Alternatively, the first communication unit 124 may send the connection signal when the image reading apparatus 100 has been connected to the information processing apparatus 200, and may send the disconnection signal when it is disconnected from the information processing apparatus 200. The information processing apparatus 200 can thus display a list of image reading apparatuses by arranging the image reading apparatuses in descending order of the time they were set ready for communication.

Alternatively, the state detection unit 132 may monitor two or more of the above operational state changes, and may determine that the operational state has changed when any one of the changes is detected. The information processing apparatus 200 can then display a list of image reading apparatuses by arranging the image reading apparatuses in descending order as each action occurred.

As has been described in detail above, by operating in accordance with the sequence diagram of FIG. 8, the information processing apparatus can display a list of a plurality of image reading apparatuses by arranging them in descending order as each operational state changed. Accordingly, in an image processing system having a plurality of image reading apparatuses and an information processing apparatus, it is easier for the user to select a desired image reading apparatus by operating the information processing apparatus, and the user convenience can thus be enhanced.

Figure 10:
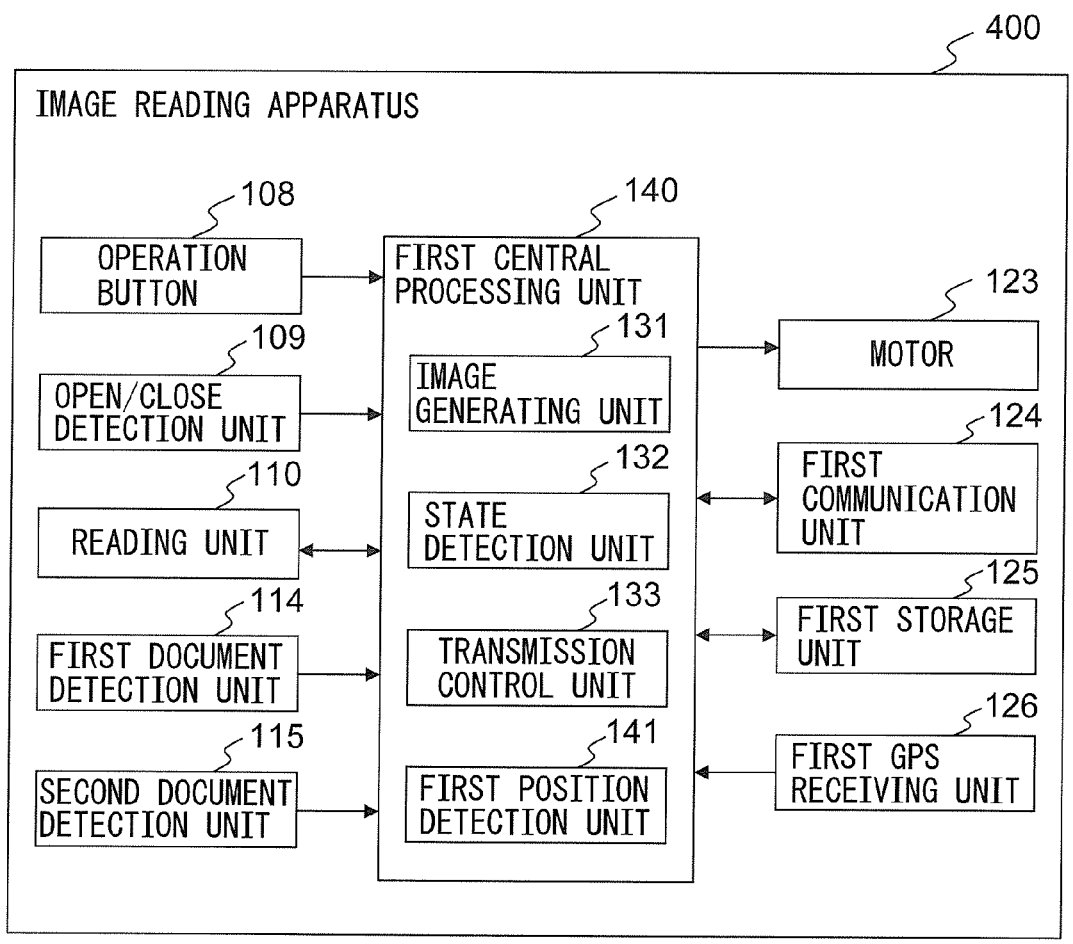
FIG. 10 is a diagram illustrating schematically the configuration of an alternative image reading apparatus.

FIG. 10 is a diagram illustrating schematically the configuration of an alternative image reading apparatus. The image reading apparatus 400 shown in FIG. 10 differs from the image reading apparatus 100 shown in FIG. 5 by the addition of a first GPS (Global Positioning System) receiving unit 126 and by the provision of a first central processing unit 140 in place of the first central processing unit 130. The first central processing unit 140 differs from the first central processing unit 130 by the addition of a first position detection unit 141.

The first GPS receiving unit 126 receives GPS signals from four or more GPS satellites (not shown), and supplies the position of each GPS satellite and the transmit time and receive time of each GPS signal to the first central processing unit 140.

The first position detection unit 141 computes the position of the image reading apparatus 400 based on the information received from the first GPS receiving unit 126, and transmits the position information of the image reading apparatus 400 to the information processing apparatus via the first communication unit 124.

Figure 11:
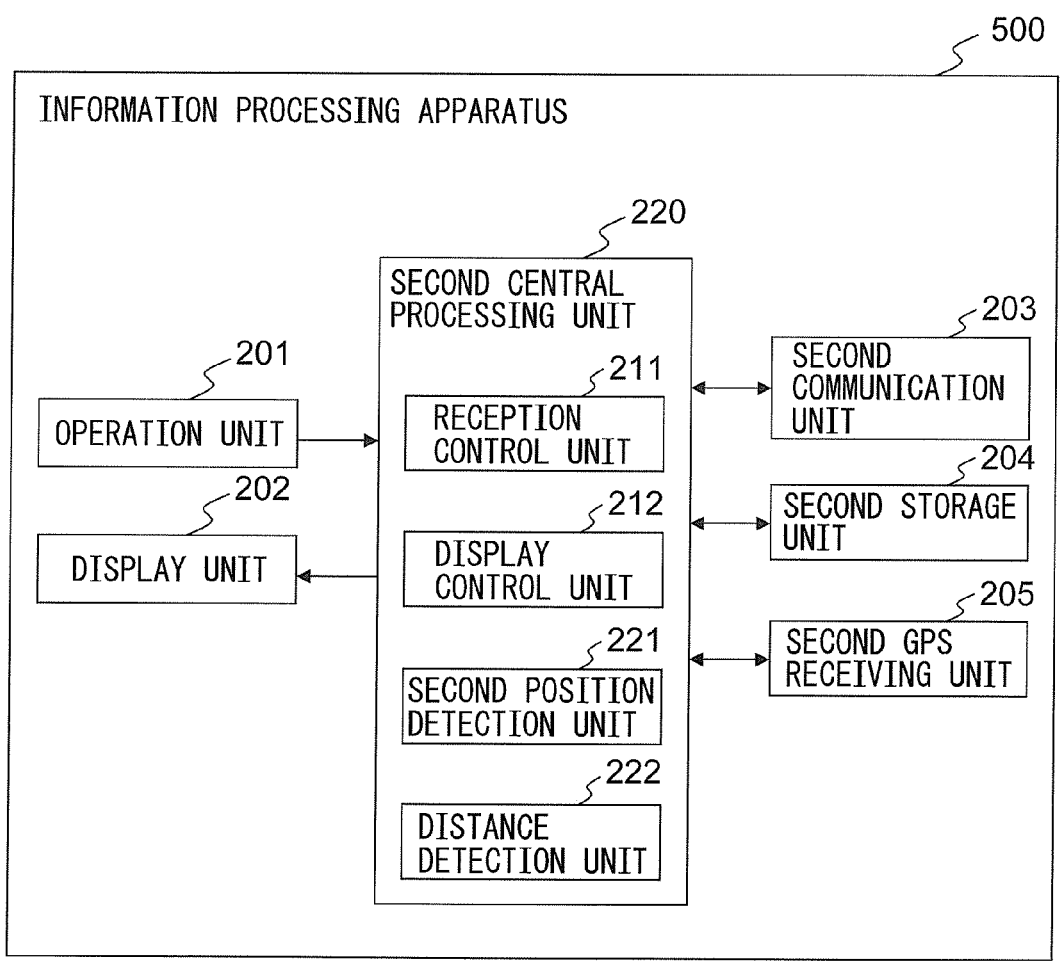
FIG. 11 is a diagram illustrating schematically the configuration of an alternative information processing apparatus.

FIG. 11 is a diagram illustrating schematically the configuration of an alternative information processing apparatus. The information processing apparatus 500 shown in FIG. 11 differs from the information processing apparatus 200 shown in FIG. 7 by the addition of a second GPS receiving unit 205 and by the provision of a second central processing unit 220 in place of the second central processing unit 210. The second central processing unit 220 differs from the second central processing unit 210 by the addition of a second position detection unit 221 and a distance detection unit 222.

Similarly to the first GPS receiving unit 126, the second GPS receiving unit 205 receives GPS signals from GPS satellites, and passes various pieces of information to the second central processing unit 220.

The second position detection unit 221 computes the position of the information processing apparatus 500 based on the information received from the second GPS receiving unit 205, and passes the position information of the information processing apparatus 500 to the distance detection unit 222.

Based on the position information of the information processing apparatus 500 received from the second position detection unit 221 and the position information of each image reading apparatus 400 received via the second communication unit 203, the distance detection unit 222 computes the distance between the information processing apparatus 500 and the image reading apparatus 400, and passes the thus computed distance to the display control unit 212.

The display control unit 212 creates a list of image reading apparatuses whose operational states have not changed by selecting such image reading apparatuses from among the image reading apparatuses 400 and arranging the selected image reading apparatuses in increasing order of the distance received from the distance detection unit 222, and causes the display unit 202 to display the thus created list along with a list of image reading apparatuses whose operational states have changed.

The image reading apparatus 400 and the information processing apparatus 500 may compute their own positions based on wireless signals from access points, not based on the GPS signals received from the GPS satellites. In that case, the image processing system 1 includes three or more access points, and each access point transmits its own position information to both the image reading apparatus 400 and the information processing apparatus 500.

The first communication unit 124 in the image reading apparatus 400 detects the intensity of the radiowave signal received from each access point, and passes information indicating the radiowave intensity to the first position detection unit 141. The first position detection unit 141 estimates the distance between the image reading apparatus 400 and the access point by utilizing the property that the received radiowave intensity decreases with increasing distance, and computes the position of the image reading apparatus 400 based on the estimated distance and the position information of the access point received via the first communication unit 124.

Similarly, the second communication unit 203 in the information processing apparatus 500 detects the intensity of the radiowave signal received from each access point, and passes information indicating the radiowave intensity to the second position detection unit 221. The second position detection unit 221 estimates the distance between the information processing apparatus 500 and the access point based on the received radiowave intensity, and computes the position of the information processing apparatus 500 based on the estimated distance and the position information of the access point received via the second communication unit 203.

As described in detail above, the information processing apparatus can display a list of image reading apparatuses whose operational states have not changed by arranging such image reading apparatuses in increasing order of the distance from the information processing apparatus. This serves to further enhance user convenience since it is easier for the user to select a desired image reading apparatus from among the image reading apparatuses whose operational states have not changed.

Figure 12:
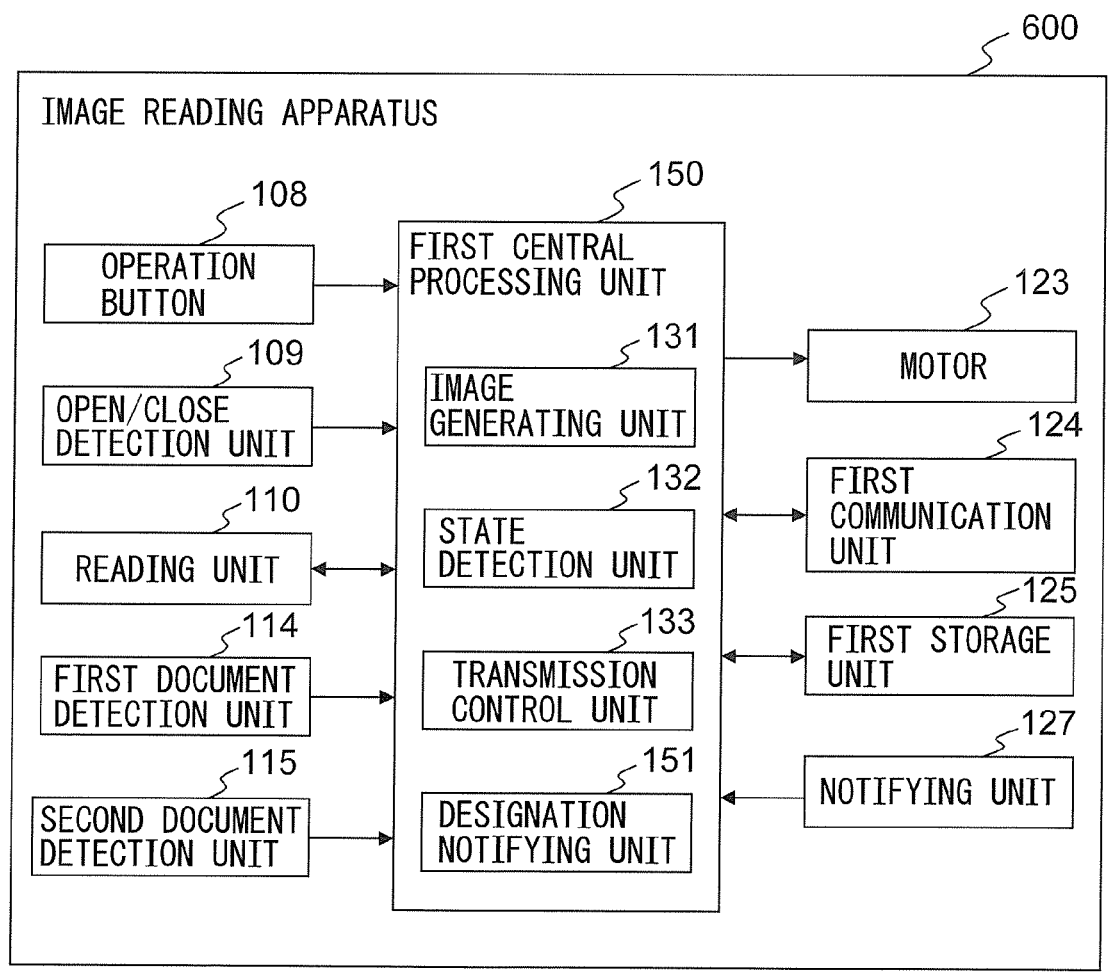
FIG. 12 is a diagram illustrating schematically the configuration of another alternative image reading apparatus.

FIG. 12 is a diagram illustrating schematically the configuration of another alternative image reading apparatus. The image reading apparatus 600 shown in FIG. 12 differs from the image reading apparatus 100 shown in FIG. 5 by the addition of a notifying unit 127 and by the provision of a first central processing unit 150 in place of the first central processing unit 130. The first central processing unit 150 differs from the first central processing unit 130 by the addition of a designation notifying unit 151.

The notifying unit 127 provides an audible or visual notification to the user, and includes at least one of a speaker, a lamp such as an LED (Light Emitting Diode), and a display device such as a liquid crystal display. In the present embodiment, the operation button 108 shown in FIG. 2B incorporates a speaker and an LED lamp and thus doubles as the notifying unit 127.

Figure 13:
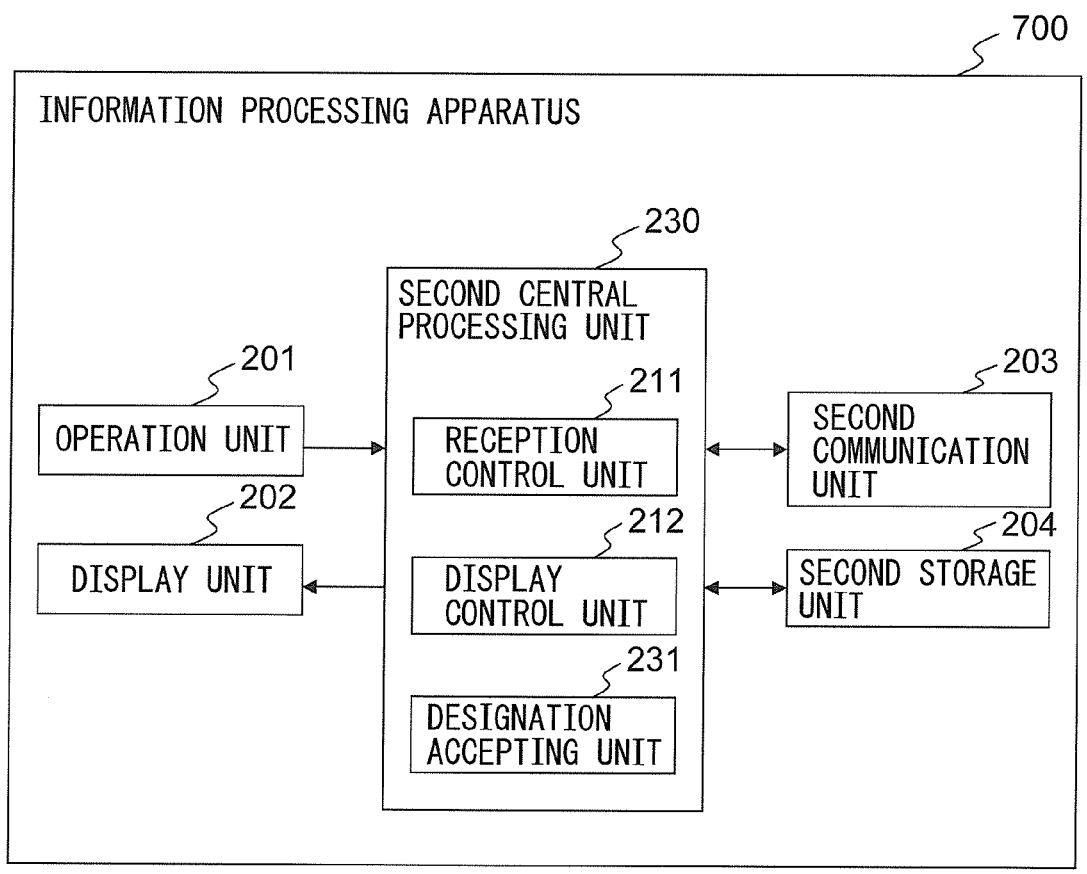
FIG. 13 is a diagram illustrating schematically the configuration of another alternative information processing apparatus.

FIG. 13 is a diagram illustrating schematically the configuration of another alternative information processing apparatus. The information processing apparatus 700 shown in FIG. 13 includes a second central processing unit 230 in place of the second central processing unit 210 shown in FIG. 7. The second central processing unit 230 differs from the second central processing unit 210 by the addition of a designation accepting unit 231.

Figure 14:
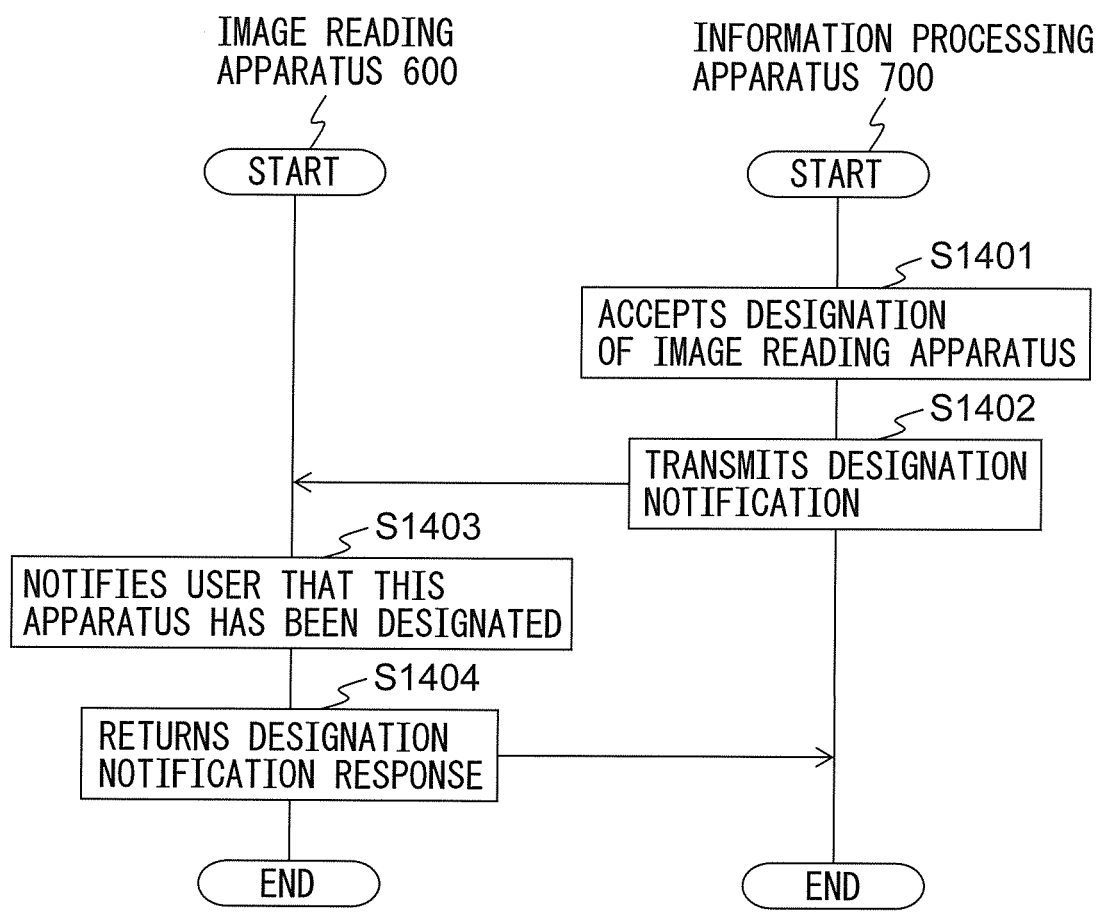
FIG. 14 is a sequence diagram illustrating an example of a sequence of image reading apparatus designating operations.

FIG. 14 is a sequence diagram illustrating an example of the sequence of image reading apparatus designating operations performed in the image processing system 1. One example of the sequence of image reading apparatus designating operations will be described below with reference to the sequence diagram of FIG. 14. The sequence of operations described hereinafter is carried out in the image reading apparatus 600 primarily by the first central processing unit 150 in collaboration with the various component elements of the image reading apparatus 600 in accordance with the program prestored in the first storage unit 125, and in the information processing apparatus 700 primarily by the second central processing unit 230 in collaboration with the various component elements of the information processing apparatus 700 in accordance with the program prestored in the second storage unit 204.

First, the designation accepting unit 231 in the information processing apparatus 700 accepts via the operation unit 201a designation of an image reading apparatus that the user designated as a control target from the list of image reading apparatuses displayed by the display unit 202 under the control of the display control unit 212 (step S1401).

The designation accepting unit 231 that accepted the designation of the image reading apparatus transmits a designation notification to the designated information reading apparatus via the second communication unit 203 to notify that the image reading apparatus has been designated as the control target (step S1402).

The designation notifying unit 151 in the image reading apparatus 600 that received the designation notification via the first communication unit 124 turns on the LED of the notifying unit 127 or causes the speaker to produce a sound, thereby notifying the user that the image reading apparatus 600 has been designated as the control target (step S1403). When accepting the designation of the image reading apparatus, the information processing apparatus 700 may also accept the specification of a method of notification, for example, a method that notifies the user by turning on the LED or a method that notifies the user by causing the speaker to produce a sound. In this case, the designation accepting unit 231 in the information processing apparatus 700 transmits the designation notification, including the specified method of notification, to the image reading apparatus 600, and the designation notifying unit 151 in the image reading apparatus 600 instructs the notifying unit 127 to make the notification by the specified method of notification.

The designation notifying unit 151 returns a designation notification response to the information processing apparatus 700 via the first communication unit 124 (step S1404), whereupon the series of steps is terminated.

The information processing apparatus 700 that received the designation notification response from the image reading apparatus 600 can now proceed to make various settings such as the document reading resolution of the image reading apparatus 600, the compression ratio of the image data to be generated, file type, and the destination of the generated image data. The information processing apparatus 700 can designate, as the destination of the image data, an image display device of a personal computer or portable information terminal or the like, a data storage device such as a hard disk device connectable to a network, or a server device providing Web service or the like. It is also possible to designate a plurality of such devices as the destinations. When a plurality of devices are designated as the destinations of the image data, the image reading apparatus 600 transmits the image data to all the designated devices. Further, when the image data destination information includes the display resolution, communication speed, etc., of the destination device, the information processing apparatus 700 may determine, based on these pieces of information, the resolution, compression ratio, etc., to be set in the image reading apparatus 600. Further, the information processing apparatus 700 may automatically designate itself as the image data destination. Furthermore, the information processing apparatus 700 may accept a document reading process start instruction from the user via the operation unit 201 and may cause the image reading apparatus 600 to start the document reading process accordingly.

Further, rather than allowing the user to designate the target image reading apparatus via the operation unit 201, the designation accepting unit 231 may automatically select as the control target the image reading apparatus whose operational state has changed most recently. This saves the user from having to select the target image reading apparatus and thus serves to enhance user convenience.

Alternatively, the designation accepting unit 231 may accept designation of a plurality of image reading apparatuses as control targets and may transmit the designation notification to each of the plurality of image reading apparatuses. In this case, the user can simultaneously designate a plurality of image reading apparatuses as control targets, which serves to enhance user convenience.

As has been described in detail above, by operating in accordance with the sequence diagram of FIG. 14, the image reading apparatus, when designated as the control target by the information processing apparatus, can notify the user that the image reading apparatus has been designated as the control target by turning on the LED or by causing the speaker to produce a sound. This enables the user to visually or audibly recognize the image reading apparatus that the user selected.

While the preferred embodiments thereof has been described above, it will be appreciated that the present invention is not limited to the above specific embodiments. For example, the list display screen to be displayed by the display unit 202 of the information processing apparatus is not limited to the one created by arranging the image information apparatuses from top to bottom in descending order of the time the operational state changed, but the list may be created by arranging them from top to bottom in ascending order of the time. Alternatively, rather than arranging them in order as the operational state changed, the time at which the operational state changed may be displayed by merely associating it with each individual image reading apparatus.

Furthermore, the network configuration of the image processing system 1 need not be limited to the example shown in FIG. 1, but the information processing apparatus 200 may be connected to the image reading apparatuses 100a to 100c by a wired communication circuit. In that case, the first communication unit 124 and the second communication unit 203 each include a wired communication interface circuit for transmitting and receiving signals over the wired communication circuit in accordance with a prescribed communication protocol, and communicate with each other via the respective wired communication interface circuits.

The image reading apparatus may transmit only a notification of an operational state change to the information processing apparatus, and the information processing apparatus may acquire the time at which the notification was received. In this case, the reception control unit 211 acquires the time at which the state notification was received from each individual image reading apparatus. Then, the display control unit 212 causes the display unit 202 to display a list of image reading apparatuses whose operational states have changed, by arranging such image reading apparatuses in descending order of the time the state notification indicating the operational state change was received by the reception control unit 211.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing system having a plurality of image reading apparatuses and an information processing apparatus,
    each of said plurality of image reading apparatuses comprising:
    a first communication unit for communicating with said information processing apparatus;
    a document tray capable of being opened or closed, serving as an exterior cover when the document tray is closed, and capable of having a document placed thereon to be processed by a respective image reading apparatus when the document tray is opened;
    an open/close detector, provided with a sensor located opposite to the closed document tray, for detecting an opening and closing state of the document tray;
    a state detector for detecting a change in the opening and closing state of said document tray; and
    a transmission controller for transmitting said change detected in the opening and closing state to said information processing apparatus via said first communication unit,
    said information processing apparatus comprising: a display unit;
    a second communication unit for communicating with each of said plurality of image reading apparatuses;
    a reception controller for receiving via said second communication unit said change detected in the opening and closing state;
    a distance detector for detecting a distance from said information processing apparatus to each of said plurality of image reading apparatuses; and
    a display controller for causing said display unit to display a list of image reading apparatuses that is created by selecting from said plurality of image reading apparatuses any image reading apparatus the opening and closing state of which has changed, and by arranging said selected image reading apparatuses in order of the time the opening and closing state changes, extracting from said plurality of image reading apparatuses any image reading apparatus the opening and closing state of which has not changed, and causing said display unit to display a list of image reading apparatuses that is created by arranging any image reading apparatus the opening and closing state of which has not changed in increasing order of said distances, subsequent to the displayed list of image reading apparatuses the opening and closing states of which have changed.

2. The image processing system according to claim 1, wherein
    said state detector acquires the time at which the opening and closing state changes,
    said transmission controller transmits the time at which the opening and closing state changes along with the opening and closing state change, to said information processing apparatus,
    said reception controller receives the time at which the opening and closing state changes along with the opening and closing state change, and
    said display controller causes said display unit to display a list of image reading apparatuses that is created by selecting from said plurality of image reading apparatuses any image reading apparatus the opening and closing state of which has changed and by arranging said selected image reading apparatuses in descending order of the time the opening and closing state changes.

3. The image processing system according to claim 1, wherein said display controller causes said display unit to display a list of image reading apparatuses that is created by selecting from said plurality of image reading apparatuses any image reading apparatus the opening and closing state of which has changed, and by arranging said selected image reading apparatuses in descending order of the time said reception controller received the opening and closing state change.

4. The image processing system according to claim 1,
    said information processing apparatus further comprising:
    an operation unit; and
    a designation accepting unit for accepting via said operation unit a designation of a specific image reading apparatus selected from said image reading apparatuses displayed by said display unit, and transmitting a designation notification to said designated image reading apparatus via said second communication unit to notify that said image reading apparatus has been designated, and each of said plurality of image reading apparatuses further comprising:

a notifying unit for producing an audible or visual notification; and a designation notifying unit for producing a notification via said notifying unit to notify that said image reading apparatus has been designated, upon receipt of said designation notification via said first communication unit.

5. The image processing system according to claim 4, wherein said transmission controller autonomously transmits a change detected in the opening and closing state.

6. The image processing system according to claim 4, wherein said transmission controller transmits a change detected in the opening and closing state to said information processing apparatus when requested by said information processing apparatus to transmit any change detected in the opening and closing state.

7. An information processing apparatus comprising:

a display unit;

a communication unit for communicating with each of a plurality of image reading apparatuses, wherein said each image reading apparatus comprises a document tray capable of being opened or closed, serving as an exterior cover when the document tray is closed, and capable of having a document placed thereon to be processed by a respective image reading apparatus when the document tray is opened, and an open/close detector, provided with a sensor located opposite to the closed document tray, for detecting an opening and closing state of the document tray, and detects a change in the opening and closing state;

a reception controller for receiving via said communication unit a change detected in the opening and closing state of said each image reading apparatus;

a distance detector for detecting a distance from said information processing apparatus to each of said plurality of image reading apparatuses; and a display controller for causing said display unit to display a list of image reading apparatuses that is created by selecting from said plurality of image reading apparatuses any image reading apparatus the opening and closing state of which has changed and by arranging said selected image reading apparatuses in order of the time the opening and closing state changes, extracting from said plurality of image reading apparatuses any image reading apparatus the opening and closing state of which has not changed, and causing said display unit to display a list of image reading apparatuses that is created by arranging any image reading apparatus the opening and closing state of which has not changed in increasing order of said distances, subsequent to the displayed list of image reading apparatuses the opening and closing states of which have changed.

8. A display method comprising:

communicating with each of a plurality of image reading apparatuses, wherein said each image reading apparatus comprises a document tray capable of being opened or closed, serving as an exterior cover when the document tray is closed, and capable of having a document placed thereon to be processed by a respective image reading apparatus when the document tray is opened, and an open/close detector, provided with a sensor located opposite to the closed document tray, for detecting an opening and closing state of the document tray, and detects a change in the opening and closing state;

receiving from each of a plurality of image reading apparatuses a change detected in the opening and closing state of said each image reading apparatus;

receiving a distance from said information processing apparatus to each of said plurality of image reading apparatuses;

displaying, using a computer, a list of image reading apparatuses that is created by selecting from said plurality of image reading apparatuses any image reading apparatus the opening and closing state of which has changed and by arranging said selected image reading apparatuses in order of the time the opening and closing state changes;

extracting from said plurality of image reading apparatuses any image reading apparatus the opening and closing state of which has not changed, and displaying a list of image reading apparatuses that is created by arranging any image reading apparatus the opening and closing state of which has not changed in increasing order of said distances, subsequent to the displayed list of image reading apparatuses the opening and closing states of which have changed.

9. A computer-readable, non-transitory medium storing a computer program, said computer program causes a computer to execute a process, the process comprising:

communicating with each of a plurality of image reading apparatuses, wherein said each image reading apparatuses comprises a document tray configured to be able to be opened or closed, serving as an exterior cover when the document tray is closed, and being set so that a document can be placed thereon to be processed by a respective image reading apparatus when the document tray is opened, and an open/close detector, provided with a sensor located opposite to the closed document tray, for detecting an opening and closing state of the document tray, and detects a change in the opening and closing state;

receiving from said each image reading apparatus a change detected in an opening and closing state of said each image reading apparatus;

detecting a distance from said information processing apparatus to each of said plurality of image reading apparatuses;

displaying a list of image reading apparatuses that is created by selecting from said plurality of image reading apparatuses any image reading apparatus the opening and closing state of which has changed and by arranging said selected image reading apparatuses in order of the time the opening and closing state changes;

extracting from said plurality of image reading apparatuses any image reading apparatus the opening and closing state of which has not changed, and displaying a list of image reading apparatuses that is created by arranging any image reading apparatus the opening and closing state of which has not changed in increasing order of said distances, subsequent to the displayed list of image reading apparatuses the opening and closing states of which have changed.

* * * * *